(12) United States Patent
Sniegocki et al.

(10) Patent No.: US 12,611,987 B1
(45) Date of Patent: Apr. 28, 2026

(54) VEHICLE COLLISION WARNING SYSTEM WITH PROXIMITY SENSING AND APPROACHING VEHICLE WARNING SIGNAL GENERATION

(71) Applicant: TRUCK-LITE CO., LLC, Falconer, NY (US)

(72) Inventors: Paul G. Sniegocki, Erie, PA (US); Roger Elmer, Erie, PA (US); Michael Violi, Erie, PA (US); Justin Gregory, Erie, PA (US); Seth Ammer, Erie, PA (US); Michael Marley, Erie, PA (US); Nadim Farhat, Erie, PA (US)

(73) Assignee: TRUCK-LITE CO., LLC, Falconer, NY (US)

( * ) Notice: Subject to any disclaimer, the term of this patent is extended or adjusted under 35 U.S.C. 154(b) by 0 days.

(21) Appl. No.: 18/745,190

(22) Filed: Jun. 17, 2024

Related U.S. Application Data

(60) Provisional application No. 63/508,347, filed on Jun. 15, 2023.

(51) Int. Cl.
B60Q 9/00 (2006.01)

(52) U.S. Cl.
CPC ................................... B60Q 9/008 (2013.01)

(58) Field of Classification Search
CPC ....................................................... B60Q 9/008
USPC ........................................................... 340/435
See application file for complete search history.

(56) References Cited

U.S. PATENT DOCUMENTS

| | | | |
|---|---|---|---|
| 11,488,467 B1 * | 11/2022 | Nguyen ............... | G08B 21/043 |
| 2007/0152803 A1 * | 7/2007 | Huang ................... | B60Q 1/535 |
| | | | 340/435 |
| 2013/0093582 A1 * | 4/2013 | Walsh .................... | G08G 1/166 |
| | | | 340/436 |
| 2014/0074359 A1 * | 3/2014 | Lane ...................... | H04N 23/20 |
| | | | 348/148 |
| 2023/0135624 A1 * | 5/2023 | Gaul ..................... | G01S 13/931 |
| | | | 340/937 |

* cited by examiner

*Primary Examiner* — Kerri L Mcnally
(74) *Attorney, Agent, or Firm* — Calfee, Halter & Griswold LLP

(57) ABSTRACT

A vehicle collision warning system integral with or otherwise affixed or mounted to a first vehicle that includes a proximity sensor to detect an approaching vehicle within a predetermined safety zone and emits a warning signal to the driver of the approaching vehicle. Exemplary embodiments to not also warn the driver of the first vehicle when the approaching vehicle is detected within the safety zone of the first vehicle.

17 Claims, 4 Drawing Sheets

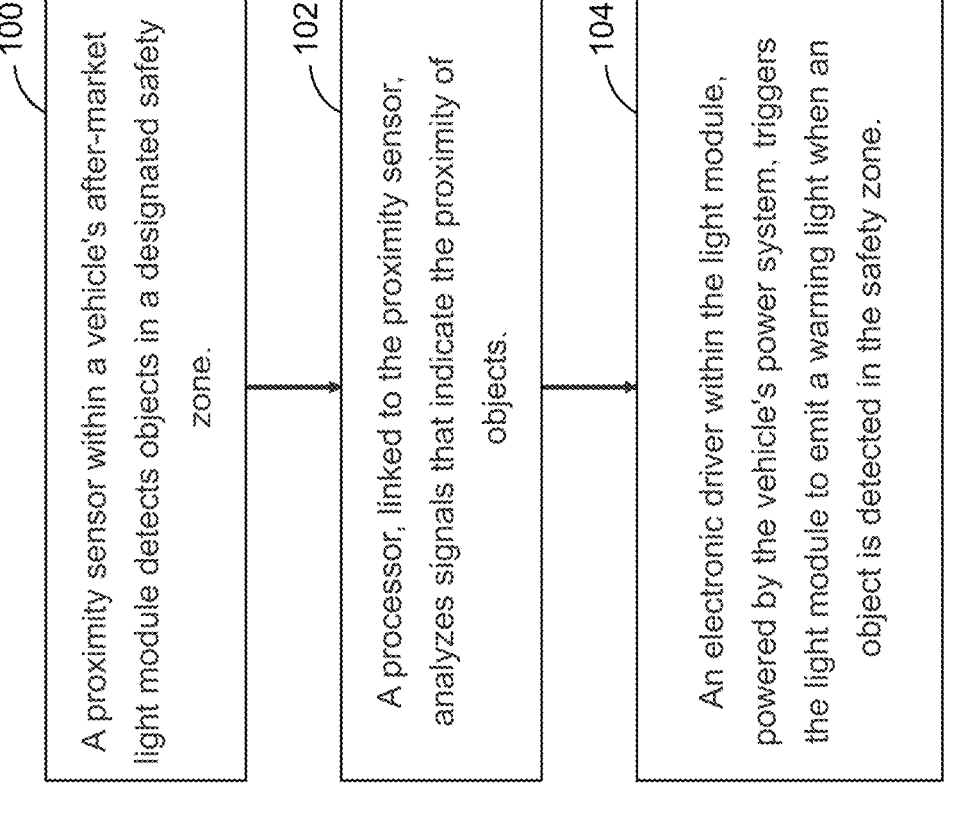

A proximity sensor within a vehicle's after-market light module detects objects in a designated safety zone.

A processor, linked to the proximity sensor, analyzes signals that indicate the proximity of objects.

An electronic driver within the light module, powered by the vehicle's power system, triggers the light module to emit a warning light when an object is detected in the safety zone.

FIG. 1

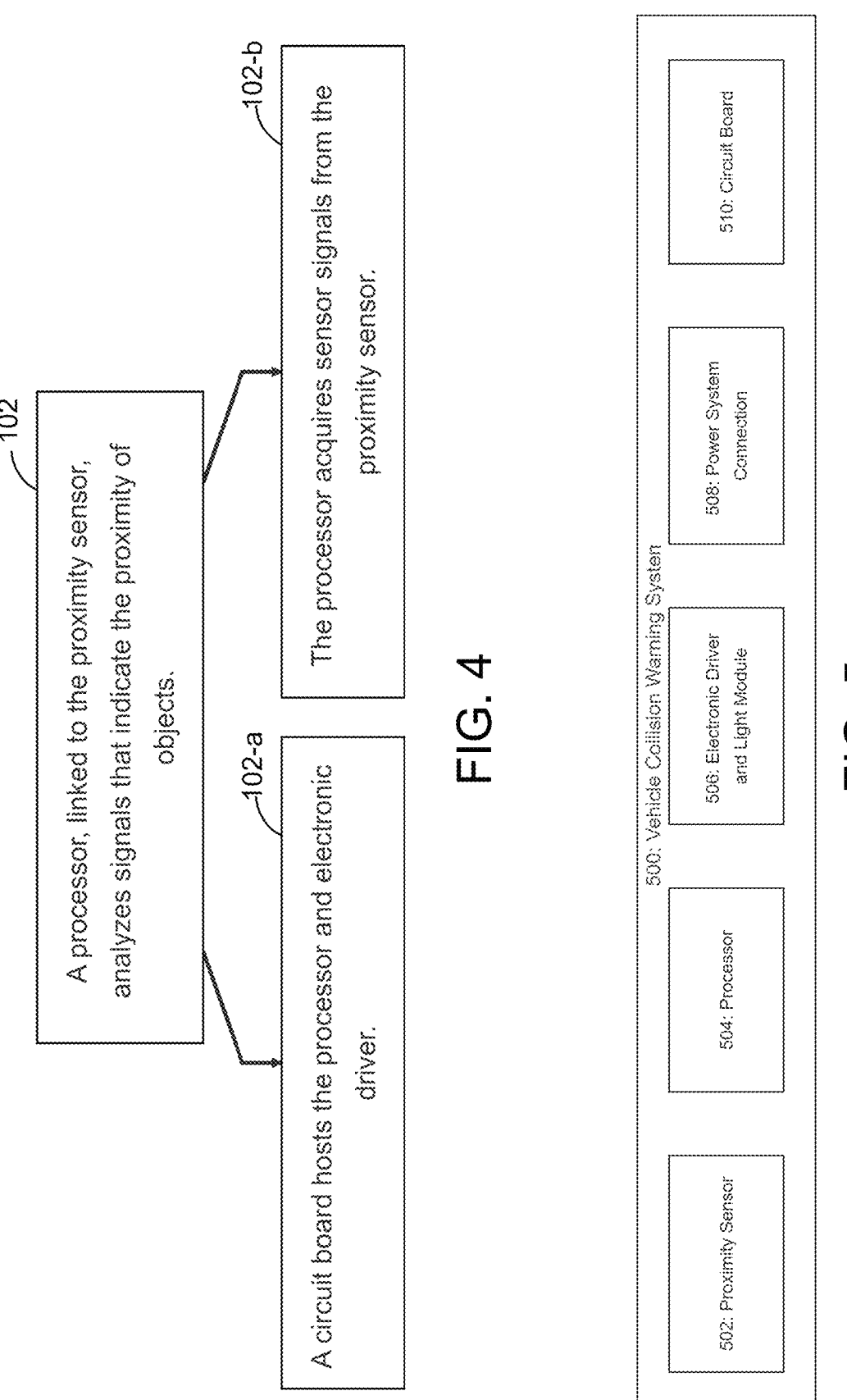

A processor, linked to the proximity sensor, analyzes signals that indicate the proximity of objects.

102-a

A circuit board hosts the processor and electronic driver.

102-b

The processor acquires sensor signals from the proximity sensor.

FIG. 5

500: Vehicle Collision Warning System

502: Proximity Sensor

504: Processor

506: Electronic Driver and Light Module

508: Power System Connection

510: Circuit Board

VEHICLE COLLISION WARNING SYSTEM WITH PROXIMITY SENSING AND APPROACHING VEHICLE WARNING SIGNAL GENERATION

CROSS-REFERENCE TO RELATED APPLICATIONS

This application claims priority to, and any other benefit of, U.S. Provisional Patent Application Ser. No. 63/508,347, filed Jun. 15, 2023, and entitled VEHICLE COLLISION WARNING SYSTEM, the entire disclosure of which is incorporated by reference herein in its entirety.

BACKGROUND

Prior art collision warning systems warn a driver of a vehicle of a possible collision.

What is needed is an enhanced collision warning system and method that address these deficiencies by providing a mechanism to warn nearby vehicles of an impending collision. Such a system should simplify the installation process, potentially in an aftermarket context, and offer a versatile design accommodating various types of proximity sensors such as radar, cameras, ultrasonic, or lidar. This would contribute to a more comprehensive vehicle safety solution, increasing the ability of drivers and nearby road users to react appropriately to potential collision hazards.

FIELD

The present disclosure relates to vehicle safety systems, particularly, collision warning systems designed to detect proximal vehicles and provide alert signals to drivers of proximal vehicles to mitigate potential collisions.

SUMMARY

In one aspect, a vehicle collision warning system is disclosed that includes a light module associated with a first vehicle, a proximity sensor configured to detect objects such as an approaching vehicle within a predetermined safety zone around the first vehicle, a processor connected to the proximity sensor for processing sensor signals indicative of object proximity, and an electronic driver configured to actuate the light module to emit a warning signal to the driver of an approaching vehicle upon detecting an approaching vehicle within the safety zone. The light module may emit a flashing signal, audible warnings, or other forms of alert to the driver of the approaching vehicle.

In exemplary embodiments, a method for warning of a potential collision is disclosed. The method includes detecting objects within a predetermined safety zone via a proximity sensor, processing sensor signals through a processor, and causing a light module to emit a warning signal when an object is detected within the safety zone. The method may optionally include the generation of audible warnings and the logging of incident data for subsequent review.

In accordance with still other exemplary embodiments, an after-market collision warning system for a vehicle is provided, comprising a housing that carries a light module, a proximity sensor, a processor, and an electronic driver. The proximity sensor, housed inside the housing, is configured to detect objects within a predetermined safety zone around the vehicle. The processor, also housed inside the housing and connected to the proximity sensor, processes sensor signals indicating object proximity. The electronic driver, powered by one or more batteries (which facilitates the after-market form factor) or by the vehicle's power system and connected to the processor, is configured to cause the light module to emit light as a warning signal to the driver of an approaching vehicle when the sensor signal indicates the approaching vehicle within the safety zone.

In accordance with other exemplary embodiments, a method of warning of a potential collision is provided. The method involves detecting objects within a predetermined safety zone around the vehicle using a proximity sensor incorporated in an after-market light module of the vehicle. A processor connected to the proximity sensor processes the sensor signals indicating object proximity. An electronic driver housed within the light module and powered by one or more batteries (which facilitates the after-market form factor) or by the vehicle's power system causes the light module to emit light as a warning signal to the driver of an approaching vehicle when the sensor signal indicates the approaching vehicle within the safety zone.

In exemplary embodiments, the foregoing is done without a separate warning signal to warn the driver of the first vehicle and without a separate warning signal device inside the first vehicle to warn the driver of the first vehicle.

BRIEF DESCRIPTION OF THE DRAWINGS

The operation of the system and method may be better understood by reference to the following detailed description, taken in conjunction with the accompanying drawing, in which:

FIG. 1 depicts an exemplary system to improve vehicle safety by integrating an advanced light module.

FIG. 4 details how a processor of an exemplary system analyzes signals from a proximity sensor to ensure vehicle safety.

FIG. 5 depicts the components of an exemplary vehicle collision warning system.

DETAILED DESCRIPTION

Figures 2, 3:
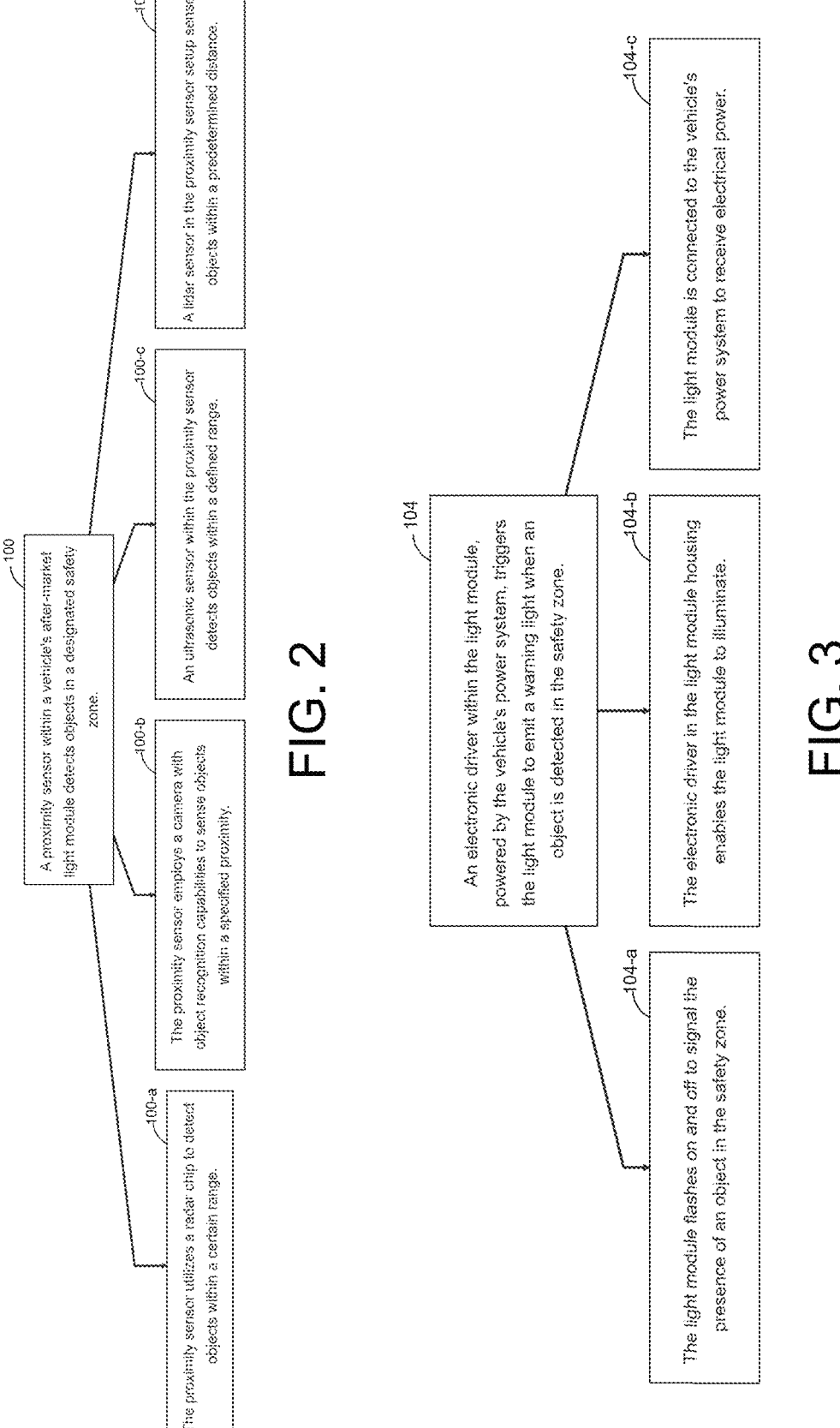
FIG. 2 showcases various technologies for detecting objects to enhance vehicle safety.
FIG. 3 illustrates the activation of a warning light of an exemplary system in response to object detection for vehicle safety.

Reference will now be made in detail to exemplary embodiments, examples of which are illustrated in the accompanying drawings. It is to be understood that other embodiments may be utilized and structural and functional changes may be made without departing from the respective scope of the claims. Moreover, features of the various embodiments may be combined or altered without departing from the scope of the claims. As such, the following description is presented by way of illustration only and should not limit in any way the various alternatives and modifications that may be made to the illustrated embodiments and still be within the spirit and scope of the claims.

There are two vehicles herein. The first vehicle is the vehicle to which the collision warning system is mounted, e.g., on the back or side of the first vehicle. This vehicle will be referred to as the "first vehicle" or simply "the vehicle." Exemplary embodiments are after-market collision warning systems that are physically connected to the first vehicle and either battery powered or electrically connected to the electrical system of the first vehicle.

The second vehicle is a vehicle that is approaching the first vehicle, e.g., from behind or from the side, which will be referred to as the "approaching vehicle."

An important aspect of exemplary systems is that, in some exemplary embodiments, a warning signal is not directed toward a driver or occupant of the first vehicle, as with many prior art systems. In exemplary embodiments, the collision warning system needs no interaction with or control by the driver of the first vehicle, other than perhaps turning it on or activating it. In some exemplary embodiments, the collision warning system needs no interaction with or control by the driver of the first vehicle at all and is hard wired to the first vehicle so that it does not need to be turned on or activated. An important aspect of this application is that, in some exemplary embodiments, the warning signal is directed to a driver of the approaching vehicle to warn the driver of the approaching vehicle that that driver needs to take action. In exemplary embodiments, the foregoing is done without a separate warning signal to warn the driver of the first vehicle and without a separate warning signal device inside the first vehicle to warn the driver of the first vehicle. In some exemplary embodiments, the driver of the approaching vehicle is also warned without the driver of the first vehicle ever even knowing that there was a potential problem (unless, for example, the warning signal includes an audio signal and the first vehicle also hears the audio signal).

In alternate embodiments, the collision warning system also includes (in addition to an approaching vehicle warning signal directed to the driver of the approaching vehicle, e.g., the warning to the driver of the approaching vehicle occurs at a first threshold distance from the first vehicle to warn the driver of the approaching vehicle without a separate warning signal to warn the driver of the first vehicle and without a separate warning signal device inside the first vehicle to warn the driver of the first vehicle) a first vehicle warning signal directed to the driver of the first vehicle, e.g., a warning to the driver of the first vehicle occurs at a second threshold distance from the first vehicle (closer to the first vehicle than the first threshold distance) to warn the driver of the first vehicle that the approaching vehicle is perhaps going to collide with the first vehicle.

Figure 6:
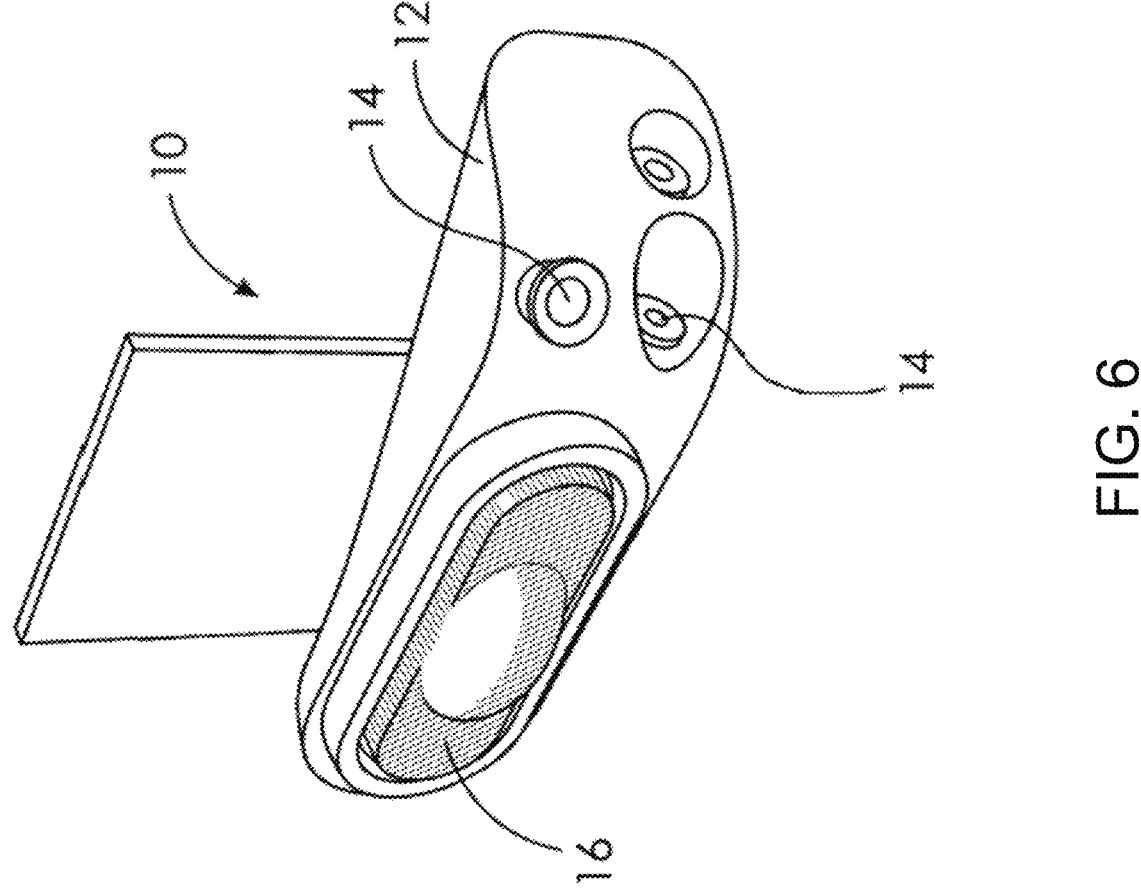
FIG. 6 illustrates a perspective view of an exemplary vehicle light collision warning system, depicting the light module and its components including the light, sensor, and processor integrated within a vehicle setting for collision warning purposes.

A vehicle collision warning system (hereinafter "collision warning system") 10 (FIG. 6) is generally presented, as described herein. The collision warning system 10 may be configured to sense an adjacent or oncoming vehicle within a predetermined safety zone and to output a warning signal to the adjacent or oncoming vehicle in response to the close proximity to the vehicle equipped with the collision warning system 10.

The collision warning system 10 may be contained within a light module 12. The sensing and processing components of the collision warning system 10 may be located and contained within a light module 12 for a commercial vehicle. The light module 12 may include a light 16, such as a stop/tail/turn light, marker light, or brake light, as well as the components of the collision warning system 10. The components within the light module 12 may include a sensor 14 and a processor, as well as any other related components.

The light or lights 16 may be designed to be replaceable on the light module 12 without requiring the replacement of or causing disruption to other components of the collision warning system 10. For instance, the light 16 may be structurally and electrically isolated to ensure ease of replacement.

The sensor 14 in the collision warning system 10 may be any appropriate type of proximity sensor, such as a radar chip, camera, ultrasonic sensor, lidar sensor, or any other sensor capable of detecting an object within a predetermined proximity to the vehicle. The sensor 14 may include object recognition capabilities, such as a camera with built-in object recognition, or the sensor data may be processed to achieve object recognition.

The sensor 14 may be configured to detect when a vehicle is located within a predetermined safety zone. The safety zone may be located along the side, corner, or rear of the vehicle, adjacent to the light module 12. Upon sensing a vehicle within the safety zone, the processor may activate an output signal to warn the oncoming vehicle that it is within the safety zone. The output signal may be an audio or visual signal, such as flashing or brightening the light 12, or it may include an audio horn or other audio output. The audio and visual outputs may also originate from other components on the vehicle, such as a horn or electronic vehicle alert system (EVAS), or from other lights located on the vehicle. Additionally, the sensor 14 and processor may send a signal to the driver, such as in the cab of a commercial vehicle, to alert the driver that a vehicle has approached the safety zone, or to inform the driver of the vehicle's proximity to an object or non-moving vehicle, such as during backing up or docking.

Incident data may be logged for data collection purposes on the processor or by a system located onboard in the cab or trailer electronic control unit (ECU). The incident log may include any sensed or related information, such as time stamp, velocity and direction of the oncoming vehicle, velocity and direction of the first vehicle at the time of the incident, and other pertinent information. The incident information may be shared with a central hub via a telematics system.

It is noted that the processor may be located onboard the light module 12, or it may be located remotely from the light module 12, such as in a central processor that receives data from multiple light modules 12.

In an exemplary embodiment, the light module housing is physically connected to the vehicle. In exemplary embodiments, the light module is powered by one or more batteries (which facilitates the after-market form factor) or electrically connected to the vehicle's power system.

In an exemplary embodiment, the light module includes an electrical circuit with a processor connected to the proximity sensor and to the electronic driver. The processor receives a sensor signal from the proximity sensor.

In one exemplary embodiment, the light module is a brake light and the warning signal comprises the brake light flashing on and off when an approaching vehicle gets too close to the first vehicle.

In another exemplary embodiment, the warning signal includes an audible warning generated by a speaker driven by an audio driver connected to the processor. In yet another exemplary embodiment, the light module is a brake light and the warning signal comprises the brake light flashing on and off when a vehicle gets too close to the first vehicle and the warning signal also includes an audible warning generated by a speaker driven by an audio driver connected to the processor.

One object of the invention is to enhance vehicle and perhaps pedestrian safety by providing an after-market solution that can be installed on existing vehicles. This system aims to alert nearby vehicles (i.e., alert drivers of nearby vehicles) of a potential collision, thereby preventing accidents through timely action by the drivers of the nearby vehicles.

In exemplary embodiments, the light module may include different types of proximity sensors such as radar chips, cameras with object recognition capabilities, ultrasonic sensors, or lidar sensors. These sensors enable the system to detect various types of objects within the safety zone and provide appropriate warnings to drivers of approaching vehicles.

In exemplary embodiments, flexibility in installation and integration with a vehicle's existing electrical system are provided. This includes the ability for the processor to be either onboard or remote from the light module, thereby offering ease of retrofitting the system to different types of vehicles.

In exemplary embodiments, the system may include the ability to log incident data for further analysis. This data can be shared via telematics systems to a central hub for review, offering valuable information for future improvements and investigations related to vehicle safety incidents.

Referring now to FIG. 1, in step 100, the system involves detecting objects within a predetermined safety zone around the vehicle using a proximity sensor incorporated in, e.g., an after-market light module. The proximity sensor is a component of the collision warning system, designed to sense the presence of an approaching vehicle or object within a specified range. This sensor can be of various types, including a radar chip, camera, ultrasonic sensor, or lidar sensor, each capable of detecting objects within a predetermined proximity. The radar chip, for instance, uses radar technology to detect objects within a certain range, while the camera can visually detect and recognize objects, thanks to its built-in object recognition capabilities. The ultrasonic sensor employs ultrasonic waves to sense objects, and the lidar sensor uses lidar technology for detection. The proximity sensor's primary function is to identify potential collision threats by sensing an oncoming vehicle or object within the safety zone. This detection capability is for the system's function of providing timely warnings to enhance safety. The sensor data may also be processed for object recognition, which is for accurately identifying and responding to various objects within the vehicle's proximity. The proximity sensor is housed inside the light module housing, which protects it from external environmental factors. This housing is physically connected to the vehicle, ensuring the system's proper function and reliability. The light module itself is electrically connected to the vehicle's power system, providing the necessary power for the sensor and other components to operate effectively.

Referring now to FIG. 2, in sub-step 100-a, the proximity sensor comprises a radar chip capable of sensing an object within a predetermined proximity. This radar chip is designed to detect objects using radar technology, enhancing the system's ability to provide timely warnings. In sub-step 100-b, the proximity sensor comprises a camera capable of sensing an object within a predetermined proximity and having built-in object recognition capabilities. This camera not only detects objects visually but also recognizes them, which is for the system's effectiveness in identifying different types of objects. In sub-step 100-c, the proximity sensor comprises an ultrasonic sensor capable of sensing an object within a predetermined proximity. This sensor uses ultrasonic waves to detect objects, adding another layer of detection capability to the system. In sub-step 100-d, the proximity sensor comprises a lidar sensor capable of sensing an object within a predetermined proximity. The lidar sensor uses lidar technology to detect objects, further enhancing the system's ability to provide accurate and timely warnings. Overall, the proximity sensor's integration into the aftermarket light module and its various detection capabilities are fundamental to the collision warning system's function of sensing potential collision threats and providing appropriate warnings to enhance vehicle safety.

Referring back to FIG. 1, in step 102, the focus is on the processing of sensor signals indicating object proximity by a processor connected to the proximity sensor. This step involves several sub-steps including, in some exemplary embodiments, sub-step 102-a and sub-step 102-b (FIG. 4). The processor is a component in the collision warning system. It is housed inside the housing to protect it from external environmental factors and facilitate the after-market form factor. The processor is configured to process sensor signals indicating object proximity, which means it analyzes the data from the proximity sensor to determine if a warning signal should be emitted. This processing is for the system to function correctly, as it ensures that the warning signals are only triggered when necessary, thereby preventing false alarms. The processor receives a sensor signal from the proximity sensor. This sensor signal contains data about the proximity of objects around the vehicle. The proximity sensor can be a radar chip, camera, ultrasonic sensor, or lidar sensor, each capable of sensing an object within a predetermined proximity. The function of the proximity sensor is to detect an oncoming vehicle within a predetermined proximity (or two different proximities) to enhance safety by providing a timely warning (or warnings). The sensor may include object recognition capabilities, such as a camera with built-in object recognition, or the sensor data may be used and processed for object recognition. The processor is connected to the electronic driver, which is also housed inside the housing. The electronic driver is configured to cause the light module to emit light as a warning signal when the sensor signal indicates an object within the safety zone. The light module may include various types of lights, such as a stop light, tail light, turning signal, marker light, or brake light. In an exemplary embodiment, the light module is a brake light, and the warning signal comprises the brake light flashing on and off when a vehicle gets too close to the vehicle. The function of the brake light flashing on and off as a warning signal is to visually alert the driver of an approaching vehicle that they are getting too close, thereby preventing potential collisions. Additionally, the light module is powered by one or more batteries (which facilitates the after-market form factor) or electrically connected to the vehicle's power system to provide the necessary power for the light module to operate and issue warnings. The light module housing is physically connected to the vehicle to securely attach the system to the vehicle, ensuring its proper function and reliability.

In sub-step 102-a, the system further comprises a circuit board carrying the processor and the electronic driver. The circuit board is a component that supports the electronic components of the collision warning system. It provides a platform for mounting and connecting the processor and the electronic driver, ensuring that these components are securely held in place and can function correctly, and facilitates the after-market form factor. The processor, which is connected to the proximity sensor and the electronic driver, is configured to process sensor signals indicating object proximity. This processing is for analyzing the data from the proximity sensor and determining if a warning signal should be emitted. The processor receives a sensor signal from the proximity sensor, which provides the necessary data for processing and making decisions about potential collision threats. The electronic driver, housed inside the light module housing, is configured to cause the light module to emit light as a warning signal when the sensor signal indicates an object within the safety zone. This driver is powered by one or more batteries or by the vehicle's power system, which supplies the necessary electrical power for the electronic driver to function. The electronic driver is connected to the processor to receive instructions on when to activate the light module based on the processed sensor signals. The light module, which can include various lights such as stop light, tail light, turning signal, marker light, or brake light, is designed to provide visual alerts to the driver of the approaching vehicle or nearby pedestrians of a potential collision. The light module is powered by one or more batteries (which facilitates the after-market form factor) or electrically connected to the vehicle's power system to ensure it has the power needed to operate and issue warnings. The light module housing is physically connected to the vehicle, ensuring the system is securely attached and can function reliably.

In sub-step 102-*b*, the processor receives a sensor signal from the proximity sensor. The processor is a component in the collision warning system, as it is responsible for processing the sensor signals indicating object proximity. The processor is housed inside the housing to protect it from external environmental factors and is connected to the proximity sensor to receive the necessary data for processing. The function of the processor in the electrical circuit, which is connected to the proximity sensor and the electronic driver, is to process the sensor signal and control the warning system based on the proximity of objects. This ensures that the system can accurately analyze the data from the proximity sensor and determine if a warning signal should be emitted. The proximity sensor, which can be a radar chip, camera, ultrasonic sensor, or lidar sensor, is configured to detect objects within a predetermined safety zone around the vehicle. The function of the proximity sensor is to identify potential collision threats by sensing an oncoming vehicle within a predetermined proximity to enhance safety by providing a timely warning. The sensor may include object recognition capabilities, such as a camera with built-in object recognition, or the sensor data may be used and processed for object recognition. This capability is for the collision warning system's effectiveness, as it allows the system to distinguish between different types of objects and respond appropriately. The processor receives the sensor signal from the proximity sensor, which is for the system to function correctly. The light module comprises an electrical circuit with a processor connected to the proximity sensor and to the electronic driver. The processor's role is to analyze the data from the proximity sensor and determine if a warning signal should be emitted. This process involves receiving the sensor signal, processing the data, and then triggering the appropriate response, such as causing the light module to emit light as a warning signal when the sensor signal indicates an object within the safety zone.

In step 104, the system is described as causing, by an electronic driver housed within the light module and powered by one or more batteries (which facilitates the after-market form factor) or by the vehicle's power system, the light module to emit light as a warning signal to the driver of the approaching vehicle or nearby pedestrians when the sensor signal indicates an approaching vehicle within the safety zone. This step involves the interaction of several key components: the electronic driver, the light module, and the vehicle's power system. The electronic driver is housed within the light module, which is for the operation of the warning system. The function of the electronic driver in the housing of the light module is to control the illumination of the light module. This driver is configured to cause the light module to emit light as a warning signal to the driver of an approaching vehicle when the sensor signal indicates an approaching vehicle within the safety zone. The light module itself includes various lights such as a stop light, tail light, turning signal, marker light, or brake light, which are used to provide visual indicators for different driving actions and warnings. Specifically, the light module includes a light that flashes on and off as a warning signal when the sensor signal indicates an object within the safety zone. This flashing light serves to visually alert the driver of an approaching vehicle that they are getting too close, thereby preventing potential collisions. The light module is powered by one or more batteries (which facilitates the after-market form factor) or electrically connected to the vehicle's power system. The function of electrically connecting the light module to the vehicle's power system is to provide the necessary power for the light module to operate and issue warnings. This connection ensures that the light module has a reliable power source to function effectively. Additionally, the light module housing includes an electronic driver that causes the light module to illuminate. The housing of the light module is physically connected to the vehicle, ensuring its proper function and reliability. This physical connection is for securely attaching the system to the vehicle.

In sub-step 104-*a*, the light module includes a light that flashes on and off as a warning signal to the driver of the approaching vehicle or nearby pedestrians when the sensor signal indicates an approaching vehicle within the safety zone. The light module is a component of the collision warning system, designed to provide a visual alert to the driver of the approaching vehicle or nearby pedestrians of a potential collision. The light module may include various types of lights such as a stop light, tail light, turning signal, marker light, or brake light. The function of these lights is to provide visual indicators for different driving actions and warnings. Specifically, the brake light flashing on and off as a warning signal is intended to visually alert the driver of an approaching vehicle that they are getting too close, thereby preventing potential collisions. The light module is housed within a housing that includes an electronic driver. The electronic driver is configured to cause the light module to emit light as a warning signal when the sensor signal indicates an object within the safety zone. The function of the electronic driver in the housing of the light module is to control the illumination of the light module, which is for the operation of the warning system. The light module is powered by one or more batteries (which facilitates the after-market form factor) or electrically connected to the vehicle's power system to provide the necessary power for the light module to operate and issue warnings. The function of electrically connecting the light module to the vehicle's power system is to ensure that the light module has a reliable power source to function effectively. The light module is part of an after-market light module incorporating a proximity type sensor. The proximity sensor can sense the presence of an approaching vehicle or object within a predetermined safety zone and create a warning, such as flashing the related light, to the vehicle or object in the zone. The proximity sensor may include various types of sensors such as a radar chip, camera, ultrasonic sensor, or lidar sensor, each capable of sensing an object within a predetermined proximity to the vehicle. The sensor may also include object recognition capabilities, such as a camera with built-in object recognition, or the sensor data may be used and processed for object recognition. The function of the proximity sensor, which can be a radar chip, camera, ultrasonic sensor, or lidar sensor, is to detect an oncoming vehicle within a predetermined proximity to enhance safety by providing a timely warning. The light module comprises an electrical circuit with a processor connected to the proximity sensor and to the electronic driver. The processor receives a sensor signal from the proximity sensor. The function of the processor in the electrical circuit, which is connected to the proximity sensor and the electronic driver, is to process the sensor signal and control the warning system based on the proximity of objects. In an exemplary embodiment, the warning signal comprises an audible warning generated by a speaker driven by an audio driver connected to the processor. The function of the brake light flashing on and off as a warning signal is to visually alert the driver of an approaching vehicle that they are getting too close, thereby preventing potential collisions.

In sub-step 104-*b*, the light module housing includes an electronic driver that causes the light module to illuminate. The light module is a component of the collision warning system, which is designed to provide visual alerts to the driver of the approaching vehicle or nearby pedestrians of a potential collision. The light module may include various types of lights such as a stop light, tail light, turning signal, marker light, or brake light. The function of the light module including these various lights is to provide visual indicators for different driving actions and warnings. Specifically, the brake light flashing on and off as a warning signal is intended to visually alert the driver of an approaching vehicle that they are getting too close, thereby preventing potential collisions. The electronic driver housed within the light module is configured to control the illumination of the light module. This is for the operation of the warning system, as it ensures that the light module emits light as a warning signal when the sensor signal indicates an object within the safety zone. The electronic driver is powered by one or more batteries (which facilitates the after-market form factor) or by the vehicle's power system, which supplies the necessary electrical power for the electronic driver to function. The function of electrically connecting the light module to the vehicle's power system is to provide the necessary power for the light module to operate and issue warnings. The light module housing is physically connected to the vehicle, ensuring its proper function and reliability. The housing protects the electronic driver and other components from external environmental factors, which is for the durability and effectiveness of the collision warning system. The function of the physical connection of the light module housing to the vehicle is to securely attach the system to the vehicle, ensuring its proper function and reliability.

In sub-step 104-*c*, in some exemplary embodiments, the vehicle's power system is electrically connected to the light module. This connection is for supplying the necessary electrical power for the light module to function effectively. The light module, which is housed within the vehicle, includes an electronic driver that controls its illumination. The function of electrically connecting the light module to the vehicle's power system is to provide the necessary power for the light module to operate and issue warnings. The light module is in a housing that includes an electronic driver to cause the light module to illuminate. The light module is powered by one or more batteries (which facilitates the after-market form factor) or electrically connected to the vehicle's power system. This connection ensures that the light module can emit light as a warning signal when the sensor signal indicates an object within the safety zone. The light module housing is physically connected to the vehicle, ensuring its proper function and reliability. The electronic driver in the housing of the light module is for controlling the illumination of the light module, which is a component of the warning system. The light module may include various types of lights such as a stop light, tail light, turning signal, marker light, or brake light, all of which serve to provide visual indicators for different driving actions and warnings. The function of the brake light flashing on and off as a warning signal is to visually alert the driver of an approaching vehicle that they are getting too close, thereby preventing potential collisions.

The collision warning system may be configured to sense an adjacent or oncoming vehicle within a given or predetermined safety zone and to output a warning signal to the adjacent or oncoming vehicle in response to the close proximity to the vehicle with the collision warning system. A vehicle light collision warning system ("collision warning system") is generally presented, as described herein. The proximity sensor can sense the presence of an approaching vehicle or object within a predetermined safety zone and create a warning—such as flashing the related light—to the vehicle or object in the zone. In an exemplary embodiment, the light module is a brake light and the warning signal comprises the brake light flashing on and off when a vehicle gets too close to the vehicle. An after-market light module incorporating a proximity type sensor. The exemplary collision warning system also comprises a proximity sensor in or on the housing to detect an oncoming vehicle, such as a radar chip, camera, ultrasonic sensor, lidar sensor, or any other type of sensor capable of sensing an object within a predetermined proximity to the vehicle. The sensor may include object recognition capabilities, such as a camera with built-in object recognition. Alternatively, the sensor data may be used and processed for object recognition. The sensor may include object recognition capabilities, such as a camera with built-in object recognition. In an exemplary embodiment, the warning signal comprises an audible warning generated by a speaker driven by an audio driver connected to the processor.

Referring now to FIG. 5, an exemplary vehicle collision warning system 500 is an after-market system designed to enhance vehicle safety by detecting approaching vehicles within a predetermined safety zone and providing a warning signal. This system comprises several key components, each with specific functions. The proximity sensor is a component of the system, responsible for detecting objects such as approaching vehicles within a predetermined safety zone around the vehicle. The proximity sensor can be a radar chip, camera, ultrasonic sensor, or lidar sensor, each capable of sensing an object within a predetermined proximity. The function of the proximity sensor is to detect an oncoming vehicle within a predetermined proximity to enhance safety by providing a timely warning. The proximity sensor can sense the presence of an approaching vehicle or object within a predetermined safety zone and create a warning, such as flashing the related light, to the vehicle or object in the zone. The sensor may include object recognition capabilities, such as a camera with built-in object recognition, or the sensor data may be used and processed for object recognition. The processor is another component, configured to process sensor signals indicating object proximity. The processor receives a sensor signal from the proximity sensor and analyzes the data to determine if a warning signal should be emitted. The function of the processor in the electrical circuit, which is connected to the proximity sensor and the electronic driver, is to process the sensor signal and control the warning system based on the proximity of objects. The electronic driver and light module work together to emit light as a warning signal. The electronic driver is configured to cause the light module to emit light as a warning signal when the sensor signal indicates an object within the safety zone. The light module may include various lights such as a stop light, tail light, turning signal, marker light, or brake light. The function of the light module including various lights is to provide visual indicators for different driving actions and warnings. In an exemplary embodiment, the light module is a brake light, and the warning signal comprises the brake light flashing on and off when a vehicle gets too close to the vehicle. The function of the brake light flashing on and off as a warning signal is to visually alert the driver of an approaching vehicle that they are getting too close, thereby preventing potential collisions. Additionally, the warning signal may comprise an audible warning generated by a speaker driven by an audio driver connected to the processor. The power system connection ensures that the electronic driver and light module are powered by one or more batteries (which facilitates the after-market form factor) or by the vehicle's power system. The light module is powered by one or more batteries (which facilitates the after-market form factor) or electrically connected to the vehicle's power system to provide the necessary power for the light module to operate and issue warnings. The function of electrically connecting the light module to the vehicle's power system is to provide the necessary power for the light module to operate and issue warnings. The circuit board carries the processor and the electronic driver, supporting the electronic components of the system. The light module comprises an electrical circuit with a processor connected to the proximity sensor and to the electronic driver. The processor receives a sensor signal from the proximity sensor. The function of the processor in the electrical circuit, which is connected to the proximity sensor and the electronic driver, is to process the sensor signal and control the warning system based on the proximity of objects. The housing of the light module is designed to carry and protect the proximity sensor, processor, and electronic driver from external environmental factors and facilitates the after-market form factor. The light module is in a housing that includes an electronic driver to cause the light module to illuminate. The light module housing is physically connected to the vehicle to securely attach the system to the vehicle, ensuring its proper function and reliability.

The proximity sensor, identified as component number 502, is an element of the vehicle collision warning system. This sensor is responsible for detecting objects within a predetermined safety zone around the vehicle. The proximity sensor can be of various types, including a radar chip, camera, ultrasonic sensor, or lidar sensor, each capable of sensing an object within a predetermined proximity. The function of the proximity sensor, which can be a radar chip, camera, ultrasonic sensor, or lidar sensor, is to detect an oncoming vehicle within a predetermined proximity to enhance safety by providing a timely warning. The proximity sensor can sense the presence of an approaching vehicle or object within a predetermined safety zone and create a warning—such as flashing the related light—to the vehicle or object in the zone. In the context of the claims, the proximity sensor is configured to detect objects within a predetermined safety zone around the vehicle. This detection capability is for identifying potential collision threats. The proximity sensor is housed inside the housing to protect it from external environmental factors, ensuring its reliability and longevity. The sensor may include object recognition capabilities, such as a camera with built-in object recognition, or alternatively, the sensor data may be used and processed for object recognition. The function of using and processing sensor data for object recognition is to accurately identify and respond to various objects within the proximity of the vehicle, which is for the collision warning system's effectiveness. The function of object recognition capabilities, such as those built into a camera, is to enhance the accuracy and functionality of the proximity sensor by enabling it to distinguish between different types of objects. The proximity sensor's role in the system is to detect objects and provide the necessary data to the processor, which then processes the sensor signals indicating object proximity. This processed data is used to determine if a warning signal should be emitted. The light module, which includes an electronic driver, is then activated to emit light as a warning signal when the sensor signal indicates an object within the safety zone. The light module may include various types of lights, such as a stop light, tail light, turning signal, marker light, or brake light, to provide visual indicators for different driving actions and warnings. The function of the brake light flashing on and off as a warning signal is to visually alert the driver of an approaching vehicle that they are getting too close, thereby preventing potential collisions.

The processor, identified as system/component number 504, plays a role in the vehicle collision warning system. This component is responsible for processing sensor signals indicating object proximity to trigger a warning. The processor is housed inside the housing to protect it from external environmental factors and is carried by the housing to integrate it into the collision warning system. The processor is configured to process sensor signals indicating object proximity, which is for analyzing the data from the proximity sensor and determining if a warning signal should be emitted. In the context of the claims, the processor is described as being carried by and housed inside the housing and connected to the proximity sensor. It is configured to process sensor signals indicating object proximity. This is further elaborated in the description, where the processor is part of an electrical circuit within the light module. The processor receives a sensor signal from the proximity sensor and is connected to the electronic driver. The function of the processor in the electrical circuit, which is connected to the proximity sensor and the electronic driver, is to process the sensor signal and control the warning system based on the proximity of objects. The processor's actions include receiving a sensor signal, which is for processing and triggering a warning. This action is described in the claims as processing sensor signals indicating object proximity and in the description as receiving a sensor signal. The processor's function is to analyze the data from the proximity sensor and determine if a warning signal should be emitted. This is for the collision warning system's effectiveness, as it ensures timely and accurate warnings to prevent potential collisions. The processor's attributes include being housed inside the housing to protect it from external environmental factors and being carried by the housing to integrate it into the collision warning system. It is configured to process sensor signals indicating object proximity, which is for analyzing the data from the proximity sensor and determining if a warning signal should be emitted. The processor is connected to the proximity sensor and the electronic driver, forming an electrical circuit within the light module. The processor receives a sensor signal from the proximity sensor, which is for processing and triggering a warning.

The component number 506, identified as the Electronic Driver and Light Module, plays a role in the vehicle collision warning system. This component includes both the electronic driver and the light module, which work in tandem to emit light as a warning signal. The electronic driver is housed inside the light module housing, which is physically connected to the vehicle. This housing protects the electronic driver from external environmental factors, ensuring its proper function and reliability. The electronic driver is configured to cause the light module to emit light as a warning signal when the sensor signal indicates an object within the safety zone. This is for alerting the driver of an approaching vehicle or nearby pedestrians of a potential collision. The light module itself comprises various types of lights, such as a stop light, tail light, turning signal, marker light, or brake light. These lights provide visual indicators for different driving actions and warnings. Specifically, the light module includes a light that flashes on and off as a warning signal when the sensor signal indicates an object within the safety zone. This flashing light serves to visually alert the driver of an approaching vehicle that they are getting too close, thereby preventing potential collisions. The electronic driver is powered by one or more batteries (which facilitates the after-market form factor) or by the vehicle's power system, which supplies the necessary electrical power for the electronic driver to function. The light module is powered by one or more batteries (which facilitates the after-market form factor) or electrically connected to the vehicle's power system to provide the necessary power for the light module to operate and issue warnings. This connection ensures that the light module can continuously function and provide timely warnings to enhance safety. The processor, which is part of the electrical circuit within the light module, is connected to the proximity sensor and the electronic driver. The processor receives a sensor signal from the proximity sensor, which detects objects within a predetermined safety zone around the vehicle. The processor then processes these sensor signals indicating object proximity to analyze the data and determine if a warning signal should be emitted. This processing is for the timely and accurate activation of the warning system. In an exemplary embodiment, the light module is a brake light, and the warning signal comprises the brake light flashing on and off when a vehicle gets too close to the vehicle. This specific use of the brake light as a warning signal is particularly effective in alerting drivers of potential rear-end collisions. Additionally, the system may include an audible warning generated by a speaker driven by an audio driver connected to the processor. This provides an additional layer of warning, ensuring that both visual and auditory alerts are available to prevent collisions.

The Power System Connection, identified as component number 508, is a part of the vehicle collision warning system. This component ensures that the electronic driver and light module are powered by one or more batteries (which facilitates the after-market form factor) or by the vehicle's power system. The components associated with this part include the electronic driver and the light module, both of which are for the system's operation. In the context of the claims, the electronic driver and light module are powered by one or more batteries (which facilitates the after-market form factor) or by the vehicle's power system. This is explicitly stated in the claims as powered by one or more batteries (which facilitates the after-market form factor) or by the vehicle's power system and electrically connected to the light module. The function of electrically connecting the light module to the vehicle's power system is to provide the necessary power for the light module to operate and issue warnings. This connection is for the functionality of the collision warning system, as it ensures that the light module can emit light as a warning signal when the sensor signal indicates an object within the safety zone. The description further elaborates that the light module is in a housing that includes an electronic driver to cause the light module to illuminate. The light module is powered by one or more batteries (which facilitates the after-market form factor) or electrically connected to the vehicle's power system. This connection is for the operation of the warning system, as it allows the light module to receive the necessary power to function correctly. The light module housing is physically connected to the vehicle, ensuring its proper function and reliability. The electronic driver, housed within the light module, is responsible for controlling the illumination of the light module. This is for the operation of the warning system, as the electronic driver causes the light module to emit light as a warning signal when the sensor signal indicates an object within the safety zone. The light module may include various types of lights, such as a stop light, tail light, turning signal, marker light, or brake light, to provide visual indicators for different driving actions and warnings.

The circuit board, identified as system/component number 510, plays a role in the vehicle collision warning system by carrying the processor and the electronic driver, thereby supporting the electronic components of the system. The circuit board is responsible for carrying the processor and the electronic driver, which are for the system's operation. The processor is configured to process sensor signals indicating object proximity, while the electronic driver is configured to cause the light module to emit light as a warning signal when the sensor signal indicates an object within the safety zone. In the context of the description, the circuit board is physically connected to the vehicle, ensuring the proper function and reliability of the system. The light module comprises an electrical circuit with a processor connected to the proximity sensor and to the electronic driver. The processor receives a sensor signal from the proximity sensor, which is for processing and determining if a warning signal should be emitted. The light module is in a housing that includes an electronic driver to cause the light module to illuminate. The light module is powered by one or more batteries (which facilitates the after-market form factor) or electrically connected to the vehicle's power system, providing the necessary power for the light module to operate and issue warnings. The proximity sensor, which can be a radar chip, camera, ultrasonic sensor, or lidar sensor, is configured to detect objects within a predetermined safety zone around the vehicle. The sensor may include object recognition capabilities, such as a camera with built-in object recognition, or the sensor data may be used and processed for object recognition. The function of the proximity sensor is to detect an oncoming vehicle within a predetermined proximity to enhance safety by providing a timely warning. The processor, connected to the proximity sensor and the electronic driver, processes the sensor signal and controls the warning system based on the proximity of objects. The function of the processor in the electrical circuit is to analyze the data from the proximity sensor and determine if a warning signal should be emitted. The light module, which may include various lights such as a stop light, tail light, turning signal, marker light, or brake light, provides visual indicators for different driving actions and warnings. In an exemplary embodiment, the light module is a brake light, and the warning signal comprises the brake light flashing on and off when a vehicle gets too close to the vehicle. The electronic driver, housed inside the light module housing, is configured to cause the light module to emit light as a warning signal when the sensor signal indicates an object within the safety zone. The function of the electronic driver is to control the illumination of the light module, which is for the operation of the warning system. The light module housing is physically connected to the vehicle, ensuring its proper function and reliability.

In exemplary embodiments, the light module or warning system is mounted on or integral with a car, van, SUV, or other vehicle at the back or side of the vehicle. In other exemplary embodiments, the "vehicle" is a semi-trailer truck (also known simply as a semi-trailer, tractor trailer, or simply a "semi" in the United States), i.e., a trailer being pulled by a tractor unit, and the light module or warning system is mounted on or integral with the trailer at the back or side of the trailer.

Exemplary embodiments have described a warning signal directed toward a driver of an approaching vehicle. This can take the form of the collision warning system simply being mounted at the back of the first vehicle and aimed back behind the first vehicle.

In some other exemplary embodiments, the light module or warning system is also in communication with other systems of the vehicle, such as through a CAN bus connection, that allows the processor to receive status information about the first vehicle, such as speed, acceleration, braking, etc., which status information is used in determining when to trigger a warning to the driver of the approaching vehicle and/or used in determining when to trigger a warning to the driver of the first vehicle. For example, an approaching vehicle might be at or just within the first threshold distance (which could ordinarily trigger a warning to the driver of the approaching vehicle), but communication with other systems of the vehicle indicates that the first vehicle is now accelerating away from the approaching vehicle, so no warning to the driver of the approaching vehicle is triggered unless, for example, the sensor signal indicates the approaching vehicle is within the safety zone within a second threshold distance shorter than the first threshold distance (or some other measured parameter indicating that an impact is more likely without intervention).

Such exemplary embodiments of the light module or warning system would further comprise a communications circuit connected to the processor for communicating with other systems of the vehicle via a communications bus, e.g., a CAN bus transceiver (not shown), and logic in the processor to receive data via the communications circuit (e.g., receive data via the CAN bus) and use that data to determine whether to warn the driver of the approaching vehicle or to warn both the driver of the approaching vehicle and the driver of the first vehicle. In such embodiments, the light module or warning system would also comprise a connector to connect to the communication bus, which can also power the light module or warning system.

Although the embodiments have been illustrated in the accompanying drawings and described in the foregoing detailed description, it is to be understood that the described system is not limited to just the disclosed embodiments, but is capable of numerous rearrangements, modifications, and substitutions without departing from the scope of the claims. The claims as follow are intended to encompass all modifications and alterations insofar as they fall within the scope of the claims and their equivalents.

Exemplary Embodiments (Claims Begin Below on Page 29)

1. A vehicle collision warning system, comprising: a light module associated with a vehicle; a proximity sensor configured to detect objects within a predetermined safety zone around the vehicle; a processor connected to the proximity sensor, configured to process sensor signals indicating object proximity; an electronic driver configured to actuate the light module to emit a warning signal when the sensor signal indicates an object within the safety zone.

2. The vehicle collision warning system of embodiment 1, wherein the light module comprises a light configured to flash on and off as the warning signal when the sensor signal indicates an object within the safety zone.

3. The vehicle collision warning system of any one of the foregoing embodiments, wherein the proximity sensor comprises a radar chip capable of sensing an object within the predetermined safety zone.

4. The vehicle collision warning system of any one of the foregoing embodiments, wherein the proximity sensor comprises a camera capable of sensing an object within the predetermined safety zone and including object recognition capabilities.

5. The vehicle collision warning system of any one of the foregoing embodiments, wherein the proximity sensor comprises an ultrasonic sensor capable of sensing an object within the predetermined safety zone.

6. The vehicle collision warning system of any one of the foregoing embodiments, wherein the proximity sensor comprises a lidar sensor capable of sensing an object within the predetermined safety zone.

7. The vehicle collision warning system of any one of the foregoing embodiments, wherein the processor is located onboard the light module.

8. The vehicle collision warning system of any one of the foregoing embodiments, wherein the processor is located remotely from the light module and is configured to receive data from the light module.

9. The vehicle collision warning system of any one of the foregoing embodiments, wherein the warning signal comprises an audible warning generated by a speaker connected to the processor.

10. The vehicle collision warning system of any one of the foregoing embodiments, wherein the proximity sensor is located within a light module housing, the housing being physically connected to the vehicle.

11. The vehicle collision warning system of any one of the foregoing embodiments, further comprising an electrical connection to the vehicle's power system.

12. The vehicle collision warning system of any one of the foregoing embodiments, wherein the light module further comprises an electronic driver configured to illuminate the light in the light module.

13. A method for warning of a potential collision, comprising: detecting, by a proximity sensor associated with a vehicle, objects within a predetermined safety zone around the vehicle; processing, by a processor connected to the proximity sensor, sensor signals indicating object proximity; causing, by an electronic driver, a light module to emit a warning signal when the sensor signal indicates an object within the safety zone.

14. The method of embodiment 13, wherein the light module includes a light that flashes on and off as the warning signal when the sensor signal indicates an object within the safety zone.

15. The method of any one of the foregoing embodiments, wherein the proximity sensor comprises a radar chip capable of sensing an object within the predetermined safety zone.

16. The method of any one of the foregoing embodiments, wherein the proximity sensor comprises a camera capable of sensing an object within the predetermined safety zone and having built-in object recognition capabilities.

17. The method of any one of the foregoing embodiments, wherein the proximity sensor comprises an ultrasonic sensor capable of sensing an object within the predetermined safety zone.

18. The method of any one of the foregoing embodiments, wherein the proximity sensor comprises a lidar sensor capable of sensing an object within the predetermined safety zone.

19. The method of any one of the foregoing embodiments, further comprising generating an audible warning signal.

20. The method of any one of the foregoing embodiments, further comprising logging incident data for subsequent review.

21. An after-market collision warning system for a vehicle, comprising:

a housing;

a light module carried by the housing;

a proximity sensor carried by and housed inside the housing, configured to detect objects within a predetermined safety zone around the vehicle;

a processor carried by and housed inside the housing and connected to the proximity sensor, configured to process sensor signals indicating object proximity;

an electronic driver carried by and housed inside the housing, powered by one or more batteries or by the vehicle's power system and connected to the processor, configured to cause the light module to emit light as a warning signal when the sensor signal indicates an object within the safety zone.

22. The collision warning system of embodiment 21, wherein the light module comprises a light that flashes on and off as a warning signal when the sensor signal indicates an object within the safety zone.

23. The collision warning system of any one of the foregoing embodiments, wherein the proximity sensor comprises a radar chip capable of sensing an object within a predetermined proximity.

24. The collision warning system of any one of the foregoing embodiments, wherein the proximity sensor comprises a camera capable of sensing an object within a predetermined proximity and having built-in object recognition capabilities.

25. The collision warning system of any one of the foregoing embodiments, wherein the proximity sensor comprises an ultrasonic sensor capable of sensing an object within a predetermined proximity.

26. The collision warning system of any one of the foregoing embodiments, wherein the proximity sensor comprises a lidar sensor capable of sensing an object within a predetermined proximity.

27. The collision warning system of any one of the foregoing embodiments, wherein the light module housing includes an electronic driver that causes the light module to illuminate.

28. The collision warning system of any one of the foregoing embodiments, wherein the vehicle's power system is electrically connected to the light module.

29. The collision warning system of any one of the foregoing embodiments, further comprising a circuit board carrying the processor and the electronic driver.

30. The collision warning system of any one of the foregoing embodiments, wherein the processor receives a sensor signal from the proximity sensor.

31. A method of warning of a potential collision, comprising:

detecting, by a proximity sensor incorporated in an after-market light module of a vehicle, objects within a predetermined safety zone around the vehicle;

processing, by a processor connected to the proximity sensor, sensor signals indicating object proximity;

causing, by an electronic driver housed within the light module and powered by the vehicle's power system, the light module to emit light as a warning signal when the sensor signal indicates an object within the safety zone.

32. The method of embodiment 31, wherein the light module includes a light that flashes on and off as a warning signal when the sensor signal indicates an object within the safety zone.

33. The method of any one of the foregoing embodiments, wherein the proximity sensor comprises a radar chip capable of sensing an object within a predetermined proximity.

34. The method of any one of the foregoing embodiments, wherein the proximity sensor comprises a camera capable of sensing an object within a predetermined proximity and having built-in object recognition capabilities.

35. The method of any one of the foregoing embodiments, wherein the proximity sensor comprises an ultrasonic sensor capable of sensing an object within a predetermined proximity.

36. 16. The method of any one of the foregoing embodiments, wherein the proximity sensor comprises a lidar sensor capable of sensing an object within a predetermined proximity.

37. The method of any one of the foregoing embodiments, wherein the light module housing includes an electronic driver that causes the light module to illuminate.

38. The method of any one of the foregoing embodiments, wherein the vehicle's power system is electrically connected to the light module.

39. The method of any one of the foregoing embodiments, further comprising a circuit board carrying the processor and the electronic driver.

40. The method of any one of the foregoing embodiments, wherein the processor receives a sensor signal from the proximity sensor.

41. The system or method of any one of the foregoing embodiments, further comprising not also providing another warning signal specifically directed toward a driver of the first vehicle when the sensor signal indicates an approaching vehicle within the safety zone within a first threshold distance (or some other measured parameter indicating that an impact is possible intervention).

42. The system or method of any one of the foregoing embodiments, further comprising providing another warning signal specifically directed toward a driver of the first vehicle when the sensor signal indicates the approaching vehicle within the safety zone within a second threshold distance shorter than the first threshold distance (or some other measured parameter indicating that an impact is more likely without intervention).

What is claimed is:

1. An after-market collision warning system for a first vehicle, comprising:

a housing;

a light module carried by the housing;

a proximity sensor carried by the housing, configured to detect an approaching vehicle within a predetermined safety zone around the first vehicle;

a processor carried by and housed inside the housing and connected to the proximity sensor, configured to process sensor signals indicating object proximity;

an electronic driver carried by and housed inside the housing, powered by one or more batteries or by the first vehicle's power system and connected to the processor, configured to cause the light module to emit light as a warning signal to a driver of the approaching vehicle when the sensor signal indicates the approaching vehicle within the safety zone;

wherein the collision warning system does not also provide another warning signal specifically directed toward a driver of the first vehicle when the sensor signal indicates an approaching vehicle within the safety zone within a first threshold distance (or some other measured parameter indicating that an impact is possible without intervention).

2. The collision warning system of claim 1, wherein the light module comprises a light that flashes on and off as a warning signal to a driver of the approaching vehicle when the sensor signal indicated the approaching vehicle within the safety zone.

3. The collision warning system of claim 1, wherein the light module comprises a light that flashes on and off as a warning signal to a driver of the approaching vehicle when the sensor signal indicates an approaching vehicle within the safety zone.

4. The collision warning system of claim 1, wherein the collision warning system is mounted on or otherwise affixed to the top and/or rear of the first vehicle and aimed back behind the first vehicle and/or aimed toward the side of the vehicle.

5. The collision warning system of claim 3, wherein the collision warning system is mounted on or otherwise affixed to the rear of the first vehicle and aimed back behind the first vehicle.

6. The collision warning system of claim 1, wherein the collision warning system is mounted on or otherwise affixed to the side of the first vehicle and aimed away from the side of the first vehicle.

7. A method of warning of a potential collision, comprising:

detecting, by a proximity sensor incorporated in an aftermarket light module of a first vehicle, approaching vehicle within a predetermined safety zone around the first vehicle;

processing, by a processor connected to the proximity sensor, sensor signals indicating proximity of the approaching vehicle;

causing, by an electronic driver housed within the light module and powered by one or more batteries or by the first vehicle's power system, the light module to emit light as a warning signal to a driver of the approaching vehicle when the sensor signal indicates the approaching vehicle within the safety zone;

further comprising not also providing another warning signal specifically directed toward a driver of the first vehicle when the sensor signal indicates an approaching vehicle within the safety zone within a first threshold distance (or some other measured parameter indicating that an impact is possible without intervention).

8. The method of claim 7, wherein the light module includes a light that flashes on and off as a warning signal to the driver of the approaching vehicle when the sensor signal indicates the approaching vehicle within the safety zone.

9. The method of claim 7, wherein the light module includes a light that flashes on and off as a warning signal to the driver of the approaching vehicle when the sensor signal indicates the approaching vehicle within the safety zone.

10. The method of claim 7, further comprising mounting or otherwise affixing the collision warning system to the top and/or rear of the first vehicle and aimed back behind the first vehicle and/or aimed toward the side of the vehicle.

11. The method of claim 9, further comprising mounting or otherwise affixing the collision warning system to the top and/or rear of the first vehicle and aimed back behind the first vehicle and/or aimed toward the side of the vehicle.

12. The method of claim 7, further comprising mounting or otherwise affixing the collision warning system to the rear of the first vehicle and aimed back behind the first vehicle.

13. The method of claim 7, further comprising mounting or otherwise affixing the collision warning system to the side of the first vehicle and aimed away from the side of the first vehicle.

14. The collision warning system of claim 1, wherein the collision warning system does not also provide another warning signal specifically directed toward a driver of the first vehicle when the sensor signal indicates an approaching vehicle within the safety zone within a first threshold distance (or some other measured parameter indicating that an impact is possible without intervention), but does also provide another warning signal specifically directed toward a driver of the first vehicle when the sensor signal indicates the approaching vehicle within the safety zone within a second threshold distance shorter than the first threshold distance (or some other measured parameter indicating that an impact is more likely without intervention).

15. The collision warning system of claim 1, wherein the light module comprises a light that flashes on and off as a warning signal to a driver of the approaching vehicle when the sensor signal indicates an approaching vehicle within the safety zone; and further wherein the collision warning system does not also provide another warning signal specifically directed toward a driver of the first vehicle when the sensor signal indicates an approaching vehicle within the safety zone within a first threshold distance (or some other measured parameter indicating that an impact is possible without intervention), but does also provide another warning signal specifically directed toward a driver of the first vehicle when the sensor signal indicates the approaching vehicle within the safety zone within a second threshold distance shorter than the first threshold distance (or some other measured parameter indicating that an impact is more likely without intervention).

16. The method of claim 7, further comprising not also providing another warning signal specifically directed toward a driver of the first vehicle when the sensor signal indicates an approaching vehicle within the safety zone within a first threshold distance (or some other measured parameter indicating that an impact is possible without intervention), but also providing another warning signal specifically directed toward a driver of the first vehicle when the sensor signal indicates the approaching vehicle within the safety zone within a second threshold distance shorter than the first threshold distance (or some other measured parameter indicating that an impact is more likely without intervention).

17. The method of claim 7, wherein the light module includes a light that flashes on and off as a warning signal to the driver of the approaching vehicle when the sensor signal indicates the approaching vehicle within the safety zone and further comprising not also providing another warning signal specifically directed toward a driver of the first vehicle when the sensor signal indicates an approaching vehicle within the safety zone within a first threshold distance (or some other measured parameter indicating that an impact is possible without intervention), but also providing another warning signal specifically directed toward a driver of the first vehicle when the sensor signal indicates the approaching vehicle within the safety zone within a second threshold distance shorter than the first threshold distance (or some other measured parameter indicating that an impact is more likely without intervention).

\* \* \* \* \*